(12) United States Patent
You et al.

(10) Patent No.: US 8,889,357 B2
(45) Date of Patent: Nov. 18, 2014

(54) ENCLOSED UNIT FOR RAPID DETECTION OF A TARGET NUCLEIC ACID AMPLIFICATION PRODUCT

(76) Inventors: Qimin You, Hangzhou (CN); Lin Hu, Hangzhou (CN); Jiayong Gu, Hangzhou (CN); Qinhao Yu, Hangzhou (CN)

(*) Notice: Subject to any disclaimer, the term of this patent is extended or adjusted under 35 U.S.C. 154(b) by 1385 days.

(21) Appl. No.: 12/309,055

(22) PCT Filed: Jul. 6, 2007

(86) PCT No.: PCT/CN2007/070249
§ 371 (c)(1),
(2), (4) Date: Jul. 12, 2010

(87) PCT Pub. No.: WO2008/019603
PCT Pub. Date: Feb. 21, 2008

(65) Prior Publication Data
US 2010/0285454 A1    Nov. 11, 2010

(51) Int. Cl.
*C12Q 1/68*  (2006.01)
*C12P 19/34*  (2006.01)
*B01L 3/00*  (2006.01)

(52) U.S. Cl.
CPC ......... *B01L 3/502* (2013.01); *B01L 2300/0867* (2013.01); *B01L 2200/141* (2013.01); *B01L 2300/0672* (2013.01); *B01L 3/5082* (2013.01); *B01L 2300/0663* (2013.01); *B01L 2300/0809* (2013.01)
USPC .... 435/6.12; 435/91.1; 435/283.1; 435/288.5

(58) Field of Classification Search
USPC .......................... 435/6.12, 91.1, 283.1, 288.5
See application file for complete search history.

(56) References Cited

U.S. PATENT DOCUMENTS

| | | | | |
|---|---|---|---|---|
| 5,415,839 | A | * | 5/1995 | Zaun et al. ........................ 422/64 |
| 5,647,855 | A | * | 7/1997 | Trooskin ........................ 604/175 |
| 5,955,351 | A | * | 9/1999 | Gerdes et al. .............. 435/287.2 |
| 2006/0292035 | A1 | * | 12/2006 | Gould et al. .................... 422/58 |

* cited by examiner

*Primary Examiner* — Kenneth R. Horlick
*Assistant Examiner* — Joyce Tung
(74) *Attorney, Agent, or Firm* — G Kenneth Smith (57) ABSTRACT

The invention relates to a method for rapid detection of a target nucleic acid amplification product while preventing cross-contamination between target nucleic acid amplification products and avoiding false positives, comprising the steps of: a) leaving the reaction tube unopened after the amplification reaction is finished, so as to prevent the target nucleic acid amplification product from leaking out and resulting in contamination; b) placing the unopened reaction tube inside an enclosed unit, making the target nucleic acid amplification product be transferred to a test strip from the reaction tube in a physically enclosed environment; c) performing detection in a visual read-out manner, and determining the result; d) discarding the enclosed unit in a safety place as a whole without opening it after the detection. The invention also relates to a totally enclosed unit for detecting a target nucleic acid amplification product, and still relates to applications of the totally enclosed rapid detection unit in detection of infectious pathogens, food industry, agriculture, livestock husbandry, customs quarantine control, and determination of DNA.

4 Claims, 7 Drawing Sheets

ENCLOSED UNIT FOR RAPID DETECTION OF A TARGET NUCLEIC ACID AMPLIFICATION PRODUCT

TECHNICAL FIELD

The invention relates to a totally enclosed unit for detecting a target nucleic acid amplification product, and more specifically, to a method for rapid detection of a target nucleic acid sequence amplification product in a totally enclosed detection unit by utilizing the nucleic acid thin-layer chromatography (test strip) technique. The invention also relates to use of a kit for rapid detection of a target nucleic acid amplification product in a totally enclosed rapid detection unit and in detection of infectious pathogens.

PRIOR ARTS

Polymerase Chain Reaction (PCR), invented by Cetus Corp. of America in 1985, is a highly efficient technique for in vitro amplification of specific DNA fragments by using the principle of denaturation and renaturation of DNA in the presence of in vitro DNA polymerases. PCR has made great impact in the life science world since its invention, and has been rapidly and widely applied to various fields of life sciences as well as disease diagnosis and inspection. Owning to the invention, the inventor, Mullis, was awarded the 1993 Nobel Prize for chemistry.

With the rapid development in recent years, the PCR technique has been widely applied to various fields such as medicine, molecular biology, genetic engineering, oncology, forensic analysis, and so on. Under specific in vitro conditions, PCR is capable of amplifying a single copy of DNA fragment to tens of billions of copies within several hours, thereby achieving greatly improved sensitivity of specific gene detection. Advantaged by strong specificity, high sensitivity, quick and simple operability, and good repeatability, PCR has been widely applied to clinical medicine and life sciences for specific gene amplification and detection. For example, PCR detection of various pathogens has become one of the most important means for diagnosis of infectious diseases. However, due to the powerful efficiency of PCR amplification and the method used for PCR product detection (agarose gel electrophoresis), contamination between laboratorial amplification products is extremely liable to occur, which further leads to false positives in detection, and finally, complete confusion of PCR assay results. Particularly, in the detection of venereal diseases, there are even a series of problems regarding ethics, family disputes, and social and legal issues. The problems associated with clinical applications of PCR have been paid high attention by administrative authorities of the Ministry of Health, and a series of provisions and regulations have been made on clinical applications of PCR. Meanwhile, the elimination of PCR false positives has been a major problem to be solved by researchers.

In order to prevent false positives resulted from contamination between laboratorial amplification products, it has been regulated by the Ministry of Health that PCR clinical diagnosis must be carried out in separate rooms respectively for sample treatment, amplification, and detection, and the stream should proceed in the single direction along sample treatment, amplification, and detection. Otherwise, open-tube detection is prohibited after amplification. At present, the most commonly used method for preventing contamination between laboratorial amplification products is to adopt a UNG-dUTP system, which hydrolyzes U in a DNA fragment by utilizing the feature of UNG (glycosylase) as capable of hydrolyzing uridines in dUTP-contained DNA fragments. The hydrolyzed DNA breaks from where it is hydrolyzed, and loses the function as a template, thus contamination is prevented. However, there is a precondition for using the system to prevent contamination, that is, the whole PCR system must utilizing dUTP instead of dTTP from the very beginning, and meanwhile, the cost of the anti-contamination reagent required by UNG-dUTP systems also limits the use of the reagent.

Fluorescence Quantitive PCR is a novel technique which has been developed in recent years. It both takes advantages of the high efficiency of nucleic acid amplification by the PCR technique, the high specificity of the probe technique, and the high sensitivity and metering accuracy of the spectral technique, and overcomes the disadvantages of conventional PCR techniques such as great liability to contamination, incapability of quantitation, low sensitivity of probe hybridization, and difficulty in controlling separation and elution conditions, therefore has been widely applied to gene-based clinical diagnosis of diseases. Moreover, this technique is most remarkably characterized by totally enclosed reaction, real-time detection of PCR amplification process, and needlessness of post amplification treatment on PCR products, thus overcomes the disadvantage of great liability to contamination in accompany with conventional PCR techniques, and as a result, has become a more and more important in the field of nucleic acid detection while achieving extremely wide applications in clinical detection of pathogens. However, due to a high skill requirement on operators and the high cost of instruments and reagents, this technique is not necessarily suitable for resource-limited hospitals.

As mentioned above, conventional PCR diagnosis is greatly restricted due to contamination between PCR amplification products. In order to avoid false positives resulted from laboratorial contamination, the applicant developed a unit for quickly detecting a target nucleic acid amplification product in a totally enclosed manner, referred to as A Totally Enclosed Unit For Rapid detection Of Target Nucleic Acid Amplification Product, in combination with the test strip technique for rapid detection of nucleic acids (see another patent application of the inventor, App. No. 200610003429.1). The method is advantageous in simplicity, quickness, and free of contamination, and can be widely applied to the field of life sciences for nucleic acid amplification detection in, for example, molecular biology laboratories, clinical diagnosis, detection of plant and animal diseases, customs quarantine control, medicolegal expertise, and the like.

In brief, the totally enclosed rapid detection unit for a target nucleic acid amplification product of the invention provides usages in two aspects:

first, it provides a method for rapid detection of a target nucleic acid amplification product;

second, it provides a method for preventing cross-contamination between nucleic amplification products and avoiding false positives.

SUMMARY OF THE INVENTION

The invention provides a method for rapid detection of a target nucleic acid amplification product while preventing cross-contamination between target nucleic acid amplification products and avoiding false positives.

The invention also provides a totally enclosed unit for rapid detection of a product of PCR amplification, isothermal amplification, or other amplification processes by using a test strip for nucleic acid detection.

More specifically, the invention provides a method for rapid detection of a target nucleic acid amplification product while preventing cross-contamination between target nucleic acid amplification products and avoiding false positives, comprising the steps of:

a) leaving the reaction tube unopened after the amplification reaction is finished, so as to prevent the target nucleic acid amplification product from leaking out and resulting in contamination.
b) placing the unopened reaction tube inside an enclosed unit, making the target nucleic acid amplification product be transferred to a test strip from the reaction tube in a physically enclosed environment;
c) performing detection in a visual read-out manner, and determining the result; and
d) discarding the enclosed unit in a safety place as a whole without opening it after the detection.

Figure 1:
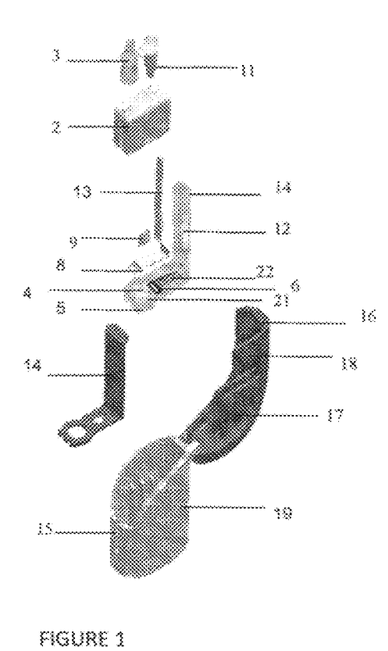
FIG. 1 is a schematic diagram of the contents of a preferred embodiment of the totally enclosed device for rapid detection of a target nucleic acid amplification product.

The invention also provides a totally enclosed unit for rapid detection of a target nucleic acid amplification product, comprising an inner core 1 and an outer casing 15, wherein the inner core 1 comprises a fixing case part 2 and a base part 5, the fixing case part 2 being provided with two holes respectively for housing washing buffer vacuoles 3 and a reaction tube 11 containing an amplification product 7; the base part 5 comprising a washing buffer container element 21 having a vacuole puncture needle 4, an amplification product container element 22 having a blade 9, a sealing diaphragm 6, a piece of glassfiber paper 8; and a test strip sealing part 14 having a test strip 13 sealed therein and a transparent window 12; and the outer casing 15 comprises a handle cover 16, a fixing case pressing part 17, a washing buffer vacuole extruding part 18, and a transparent window 20.

The invention detects an amplification product by using the totally enclosed detection unit in combination with the test strip technique for rapid detection of nucleic acids. This method is simple and rapid in operation and free of contamination, and is an innovation of amplification product detection. The invention can be used in combination with isothermal amplification techniques to develop a novel platform for rapid detection of nucleic acids, whereby qualitative and semi-quantitative detection of nucleic acids can be realized with no contamination to laboratories, and as a result, the invention can be made more widely applicable to clinical disease diagnosis and screening, as well as other fields of life sciences.

DETAILED DESCRIPTION OF THE INVENTION

By using a test strip for rapid detection of nucleic acids, the invention detects a product of PCR amplification, isothermal amplification, or other amplification processes in a totally enclosed unit. In addition to simple and quick operability, the method is most remarkably advantageous in its capability of preventing false positives resulted from laboratorial contamination between amplification products, which greatly increases the reliability of in vitro diagnostic reagents.

To be specific, the invention provides a method for rapid detection of a target nucleic acid amplification product while preventing cross-contamination between target nucleic acid amplification products and avoiding false positives, comprising the steps of:

a) leaving the reaction tube unopened after the amplification reaction is finished, so as to prevent the target nucleic acid amplification product from leaking out and resulting in contamination.
b) placing the unopened reaction tube inside an enclosed unit, making the target nucleic acid amplification product be transferred to a test strip from the reaction tube in a physically enclosed environment;
c) performing detection in a visual read-out manner, and determining the result; and
d) discarding the enclosed unit in a safety place without opening it after the detection.

According to a preferred embodiment of the invention, the enclosed unit in the above method can not be reopened once it is fastened down, so as to prevent the contaminating product inside from leaking out accidentally.

According to a more preferred embodiment of the invention, the step b) in the above method comprises opening the reaction tube as well as a washing buffer tube in a physically enclosed environment, so that the target nucleic acid amplification product is transferred to the test strip under the lead of the washing buffer.

The invention provides a totally enclosed unit for rapid detection of a target nucleic acid amplification product, comprising an inner core 1 and an outer casing 15, wherein the inner core 1 comprises a fixing case part 2 and a base part 5, the fixing case part 2 being provided with two holes respectively for housing washing buffer vacuoles 3 and a reaction tube 11 containing an amplification product 7, the base part 5 comprising a washing buffer container element 21 having a vacuole puncture needle 4, an amplification product container element 22 having a blade 9, a sealing diaphragm 6, a piece of glassfiber paper 8; and a test strip sealing part 14 having a test strip 13 sealed therein and a transparent window 12; and the outer casing 15 comprises a handle cover 16, a fixing case pressing part 17, a washing buffer vacuole extruding part 18, and a transparent window 20.

To be more specific, the invention provides a totally enclosed unit for rapid detection of a target nucleic acid amplification product, comprising an inner core 1 and an outer casing 15, wherein the inner core 1 comprises a fixing case part 2 and a base part 5, the fixing case part 2 being provided with two holes respectively for housing washing buffer vacuoles 3 and a reaction tube 11 containing an amplification product 7, the base part 5 comprising a washing buffer container element 21 having a vacuole puncture needle 4 for puncturing the washing buffer vacuoles 3, an amplification product container element 22 having a blade 9 for cutting the reaction tube 11, a sealing diaphragm between the units 21 and 22, a piece of glassfiber paper 8 disposed in the container elements 21 and 22 and connected to the bottom of a test strip 13, and a test strip sealing part having the test strip 13 sealed therein and a transparent window 12;

and the outer casing 15 comprises a handle cover 16, a fixing case pressing part 17, a washing buffer vacuole extruding part 18, and a transparent window 20 in parallel with the transparent window 12.

FIG. 1 illustrates the structure of the totally enclosed unit for rapid detection of a target nucleic acid amplification product of the invention.

Figure 2:
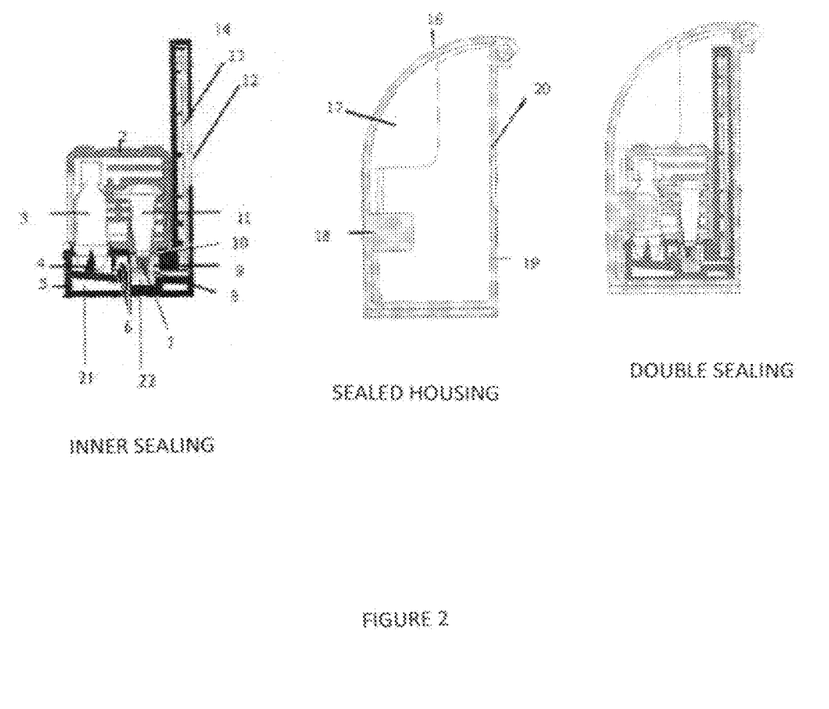
FIG. 2 is an illustration of embodiment of the totally enclosed device for rapid detection of a target nucleic acid amplification product.

In one preferred embodiment of the invention, the totally enclosed detection unit further comprises a sealing ring 10 positioned between the hole for housing the reaction tube 11 and the base 5, which ensures an intimate and sealed contact thereat, and that the amplification product will not flow back into the fixing case part 2.

In another preferred embodiment of the invention, the totally enclosed detection unit further comprises a sealing diaphragm 6 structured as three layers alternating vertically to ensure that the amplification product will not flow back, while being mixed with the washing buffer flowing in a single direction and absorbed by the test strip 13.

In still another preferred embodiment of the invention, the totally enclosed detection unit further comprises an outer casing which constitutes a totally enclosed environment, and can not be reopened once it is fastened down during the experiment, so as to prevent the contaminating product inside from leaking out accidentally.

In a more preferred embodiment of the invention, the totally enclosed detection unit further comprises a sealing ring 10 positioned between the hole for housing the reaction tube 11 and the base 5, which ensures an intimate and sealed contact thereat, and that the amplification product will not flow back into the fixing case part 2. The sealing diaphragm 6 is structured as three layers alternating vertically to ensure that the amplification product will not flow back, while being mixed with the washing buffer flowing in a single direction and absorbed by the test strip 13. And the outer casing 15 constitutes a totally enclosed environment, and can not be reopened once it is fastened down during the experiment, so as to prevent the contaminating product inside from leaking out accidentally.

FIG. 2 illustrates the structure of a preferred totally enclosed unit for rapid detection of a target nucleic acid amplification product according to the invention.

As the whole operation process is carried out in a totally enclosed state, contamination to laboratories from amplification products is prevented in a physically isolated manner, and the accuracy of in vitro diagnostic reagents can be increased.

Figure 3:
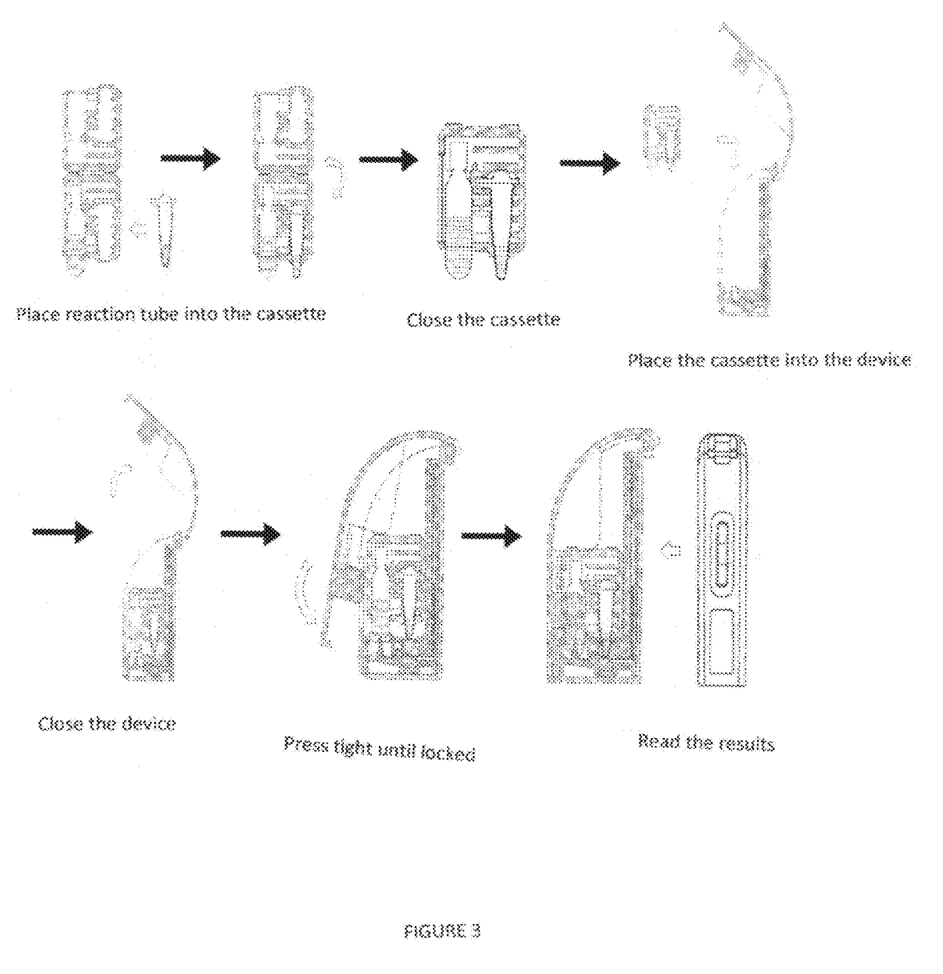
FIG. 3 is an illustration of the operation steps of the device.

In specific, the operation steps and the detection mechanism of the totally enclosed detection unit are as follows:

(1) placing the unopened reaction tube 11 inside the hole for housing the reaction tube in the fixing case part 2 (wherein the washing buffer vacuoles 3 have already been provided in the hole for housing the washing buffer vacuole tube in advance);

(2) placing the fixing case part 2 inside the outer casing 15, wherein the sealing ring 10 positioned between the hole for housing the reaction tube and the base 5 ensures an intimate and sealed contact thereat;

(3) closing the handle cover 16 of the detection unit;

(4) pressing the cover 16 of the detection unit until it is fastened down, whereby the blade 9 on the base is subjected to a pressing force by the fixing case pressing part 17 so as to cut the reaction tube 11 containing the amplification product 7, and the washing buffer vacuole puncture needle 4 on the base is subjected to an extruding force by the washing buffer vacuole extruding part 18 so as to puncture the plastic washing buffer vacuoles;

(5) through capillary phenomenon of the glassfiber paper 8, the amplification product 7 and the washing buffer are absorbed into a sample pad in the test strip 13;

(6) the liquids move along the sample pad while being mixed together and transferred towards the bottom of the nucleic acid test strip;

(7) the liquid mixture moves slowly from the bottom of the test strip to the top through capillary phenomenon, and the detection process is finished with a specific antigen-antibody reaction between the reaction liquid and the test line on the nucleic acid detection test strip;

(8) leaving still for 10 minutes, and observing the detection result;

(9) recording the detection result, and discarding the enclosed detection unit in a safety place as a whole.

FIG. 3 illustrates the operation steps of the detection unit of the invention.

In the preferred embodiments of the invention, the reaction tube is a PCR tube.

The invention also provides a method for rapid detection of a target nucleic acid amplification product, which comprises detecting a nucleic acid sequence amplification product by using the above-mentioned totally enclosed unit for rapid detection of a target nucleic acid amplification product.

The invention also provides a method for preventing cross-contamination between nucleic acid amplification products and avoiding false positives, which comprises detecting a nucleic acid sequence amplification product by using the above-mentioned totally enclosed unit for rapid detection of a target nucleic acid amplification product.

In a most preferred embodiment, the invention provides a method for rapid detection of a target nucleic acid amplification product while preventing cross-contamination between target nucleic acid amplification products and avoiding false positives, comprising the steps of:

a) leaving the reaction tube unopened after the amplification reaction is finished, so as to prevent the target nucleic acid amplification product from leaking out and resulting in contamination;

b) placing the unopened reaction tube inside an enclosed unit, making the target nucleic acid amplification product be transferred to a test strip from the reaction tube in a physically enclosed environment;

c) performing detection in a visual read-out manner, and determining the result; and d) discarding the enclosed unit in a safety place as a whole without opening it after the detection;

wherein the enclosed unit is the above-mentioned totally enclosed unit for rapid detection of a target nucleic acid amplification product, and can not be reopened once it is fastened down during the experiment, so as to prevent the contaminating product inside from leaking out accidentally.

Another patent of the applicant (App. No. 200610003429.1) describes the principle and method for the test strip detection of nucleic acids. The invention renovates the test strip technique for detecting proteins on the basis of immunoreaction into nucleic acid diagnostic reagents, the key point of which lies in transforming a target nucleic acid amplification product to be detected into molecules or a molecular compound with immunogenicity. Accordingly, basic methods of test strip technique for detecting proteins on the basis of immunoreaction can all be applied to the test strip detection of nucleic acids.

The basic method for transforming a target nucleic acid amplification product to be detected into molecules or a molecular compound is characterized by labeling probes with antigens or haptens (hereinafter abbreviated as antigens), hybridizing the labeled specific probes with the target nucleic acid amplification product to be detected, so as to form a molecular compound with immunogenicity, which can be detected by methods similar to the test strip detection of proteins.

Figure 4:
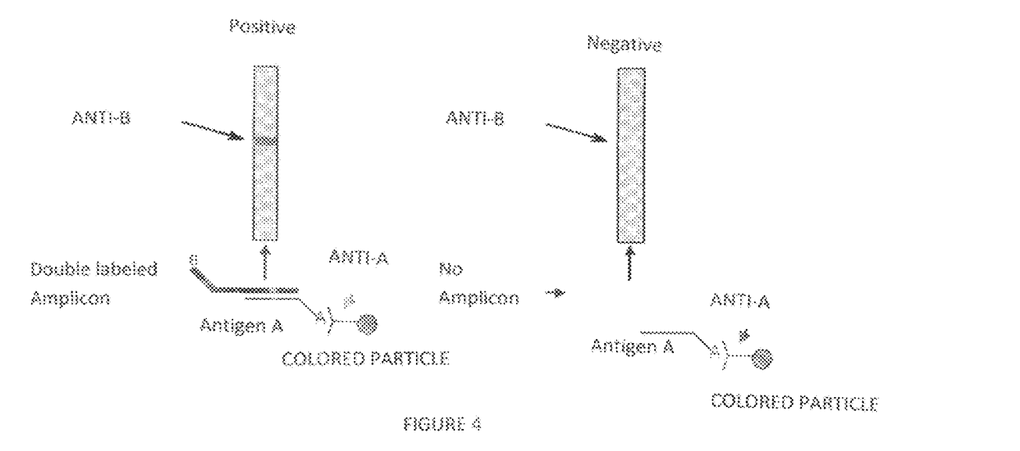
FIG. 4 is an illustration of the mechanism of detection for the test strip detection of nucleic acids by using the one-probe method.

FIG. 4 illustrates the fundamental principle for the test strip detection of nucleic acids by using the one-probe method.

Figure 5:
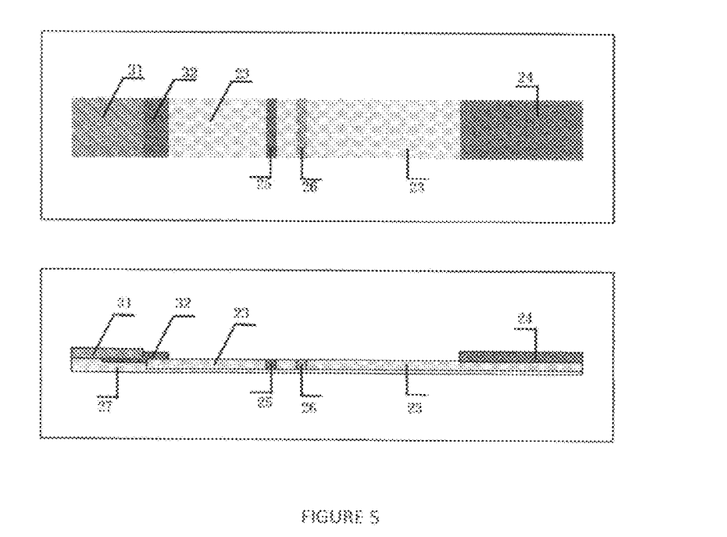
FIG. 5 is a representation that demonstrates the detection of gonococci utilizing the device and PCR amplification

FIG. 5 illustrates the basic structure of the test strip for detecting nucleic acid amplification products.

Said invention provides a test strip for detecting nucleic acid amplification products, which comprises a sample pad 31, a chromatic particle conjugate pad 32, a fibrous membrane 23, and a water-absorbing filter paper pad 24 sequentially arranged on a liner 27 with non-drying adhesive, each part partially overlapping an adjacent one, and the fibrous membrane being also equipped with a detection line 25 and a quality control line 26. The chromatic particles on the chromatic particle conjugate pad 32 are coated with anti-A antibodies, the detection line 25 is coated with anti-B antibodies, and the quality control line 26 is provided with anti-A antibodies. The chromatic particles are colloidal gold particles or latex particles, and the fibrous membrane is usually a cellulose nitrate membrane or a nylon membrane.

Detailed descriptions of the test strip technique for rapid detection of nucleic acids and the structure of the test strip for detecting nucleic acids can be referenced to another patent of the applicant (App No. 200610003429.1).

EFFECTS OF THE INVENTION

Nucleic acid amplification reaction is most typically characterized by its powerful amplification capability and superior sensitivity. But at the same time, there is also a serious problem of laboratorial contamination from amplification products capable of resulting in false positives even in ultra minute quantities. An amplification product is a micromolecular substance in massive copies (usually about $10^{11}$ copies/$\mu$L), being extremely liable to float in the air or disperse on an experimental bench or surfaces of various experimental appliances. Therefore a small carelessness in operation (sometimes unavoidable) gives great chance to false positives. However, after a conventional PCR amplification reaction, the PCR reaction tube must be opened so that all or part of the amplification product can be took out and subjected to a detection process such as agarose gel electrophoresis. This open-type detection is liable to result in contamination to laboratorial environments. Consequently, realization of amplification product detection with no contamination or in enclosed conditions has become a key problem for researchers. At present, Fluorescence real-time PCR is the only method that is capable of accomplishing a nucleic acid detection process under a totally enclosed condition.

Compared with conventional PCR detection techniques, the invention disclosed has following advantages:

(1) totally enclosed detection. The detection unit is enclosed both interiorly and exteriorly, whereby a double sealing effect is achieved:

(A) sealingness of the inner core. The needlessness of uncovering the reaction tube prevents the amplification product from leaking out in the perspective of physics, thereby the chance of contamination from the amplification product is minimized, and the occurrence of false positives in detection is prevented; the sealing ring for the fixing case ensures that the amplification product will not flow back into the fixing case, thereby the fixing case is ensured to be free from contamination; and moreover, the triplex sealing diaphragm on the base ensures that the amplification product will not flow back into the bottom of the washing buffer vacuole tube through the glassfiber paper;

(B) sealingness of the outer enclosure. The outer enclosure, composed of the outer casing, the handle cover, and the transparent window, constitutes a totally enclosed environment, and can not be reopened once it is fastened down during experiment, thus prevents the product inside from leaking out;

(2) high specificity. By adding two specific primers together with 1 or 2 specific probes into the amplification reaction, the detection reaction is made more specific;

(3) high sensibility of target nucleic acid amplification product detection after amplification;

(4) simple and quick operability. The whole detection process takes only 10 to 15 minutes, as compared to at least 1 hours required by conventional agarose gel electrophoresis;

(5) no instrument required in detection after amplification.

The unit ensures an enclosed state for detection and analysis of a nucleic acid amplification product, thus the risk of cross-contamination in accompany with methods for nucleic acid detection after conventional amplification is decreased to minimum. Meanwhile, the method offers advantages in simple and quick operability, decreased cost of detection, as well as accelerated acquisition and improved reliability of detection results. By applying the totally enclosed unit for rapid detection of a target nucleic acid amplification product, the accuracy can be greatly enhanced, and the overall cost of medical care systems can be reduced. Owning to simple and rapid operability, low cost, and the ability to prevent amplicon cross-contamination in laboratories, the unit will greatly benefit technologists working in the field of life sciences in the detection of target nucleic acid amplification products.

As a universal technical platform for enclosed detection of nucleic acid amplification products, the method and unit of the invention can be widely applied to various fields such as detection of infectious pathogens, public health emergencies, livestock husbandry and food industry, customs inspection and quarantine, environment detection, biological weapon detection, human genetic disease detection, prenuptial and prenatal examination as well as prenatal and postnatal care, medicolegal and consanguinity expertise, and the like.

In the first aspect, common pathogens include bacteria, fungi, viruses, mycoplasmas, chlamydiae, parasites, and so on. The enclosed nucleic acid amplification product detection unit can discriminate not only the pathogens, but also subtypes, virulent strains, mutant strains, and drug resistance thereof.

In the second aspect, the enclosed nucleic acid amplification product detection unit of the invention can be used for public health emergencies. China has invested heavily to establish a nationwide infectious disease prevention and control system, wherein quick diagnostic reagents for detecting fulminating infectious diseases will be used as conventional reserve in the centers of the system, so that pathogens can be rapidly discriminated and effectively controlled upon public health emergencies. Detection objects of this aspect include, for example, bird flu, SARS, cholera, plague, anthrax, Ebola, epidemic hemorrhagic fever (EHF), and the like.

In the third aspect, the enclosed nucleic acid amplification product detection unit of the invention can be used in food industry. Due to frequent alimentary toxicoses, it is quite necessary to perform detection on milk, beverages, and meat products before they leave factory with respect to certain bacteria such as fungi, colibacilluses, salmonellae, botulinuses, and the like.

In the fourth aspect, the enclosed nucleic acid amplification product detection unit of the invention can be used in agriculture. Differential diagnosis of microbes harmful to main farm crops will bring overwhelming economic and social benefits.

In the fifth aspect, the enclosed nucleic acid amplification product detection unit of the invention can be used in livestock husbandry. It finds a promising market in disease diagnosis for livestock, fish, and domestic fowls.

In the sixth aspect, the enclosed nucleic acid amplification product detection unit of the invention can be used in customs import-export quarantine control, which is also a stable and reliable market. For example, in the case of import in foreign trade, there is a demand on a complete set of quick diagnostic systems being sensitive and reliable, in order to prevent alien harmful microbes, pest eggs, and transgene products from inflowing into China. And in the case of foreign trade export, by providing an importing country with a set of completed quarantine profiles, foreign trade export of agricultural, forestry, and food products will be greatly promoted, and trade disputes will be decreased.

In the seventh aspect, the enclosed nucleic acid amplification product detection unit of the invention can be used in detection and discrimination of microbes harmful to soil, water sources, air, and other environments. A set of on-site inspection methods being easy, sensitive, and quick will be greatly significant to environment detection.

In the eighth aspect, the enclosed nucleic acid amplification product detection unit of the invention can be used for detecting biological weapons. Techniques for biological weapon detection are being developed by countries all over the world. China should also make preparation as early as possible. Common biological weapon pathogens include cholera, plague, anthrax, Ebola, epidemic hemorrhagic fever (EHF), artificially modified bacteria and viruses, and the like.

In the ninth aspect, the enclosed nucleic acid amplification product detection unit of the invention can be used for detecting gene mutations. It has been proved by modern molecular genetics that most of human diseases are relative to genes in different degrees. And according to the research on single nucleotide polymorphism (SNP), each individual has a genome style different from any one of others. Therefore, everyone is different form others in susceptibility to diseases and sensitivity to drugs. As a result, "Personalized Medicine" came into existence, finding great applicability to, for example, prediction on susceptibility to major diseases, and precise administration of an individual according to his/her sensibility and endurability to drugs determined by the unique genotype of his/her own. As there are hundreds of common diseases caused by gene mutations including gene deficiency, gene transposition, and the like, the enclosed nucleic acid amplification product detection unit of the invention can be used in developing diagnostic product series for human genetic diseases to fulfill the enormous market demand.

In the tenth aspect, the enclosed nucleic acid amplification product detection unit of the invention can be used in prenuptial examination, prenatal examination, prenatal and postnatal care, and the like.

In the eleventh aspect, the enclosed nucleic acid amplification product detection unit of the invention can be used in DNA determination of blood, semen, hairs, and other samples from crime scenes, and DNA determination of criminal suspects.

In the twelfth aspect, the enclosed nucleic acid amplification product detection unit of the invention can be used in determination of consanguinity, gene ID card, populational gene database, and the like.

The technical scheme of the invention will now be further described by the following embodiments. The embodiments are illustrative only and shall not be construed as limiting the protection extent of the invention.

EMBODIMENTS

Embodiment 1

Detecting a Product of PCR Amplification of Target Nucleic Acids in Gonococci as an Example 1. PCR Amplification:

| | |
|---|---|
| KCl (500 mmol) | 2 μL |
| Tris-HCl (pH 8.3, 100 mmol) | 2 μL |
| MgCl$_2$ (20 mmol) | 2 μL |
| dNTP (2 mmol) | 2 μL |
| Forward Primer (Biotin-labeled, 2 μmol) | 2 μL |
| Reverse Primer (2 μmol) | 2 μL |
| Reverse FITC-labeled probe (2 μmol) | 2 μL |
| Gonococci | 4000 |
| Taq DNA Polymerase | 0.5 units |
| Total | 20 μL |
| 95 DEG C. | 5 s |
| 60 DEG C. | 15 s |
| 72 DEG C. | 15 s |
| 60 cycles | |

2. Detection placing the PCR tube containing the amplification product inside the hole for housing the PCR tube in the fixing case (wherein washing buffer vacuoles have already been provided in the hole for housing the washing buffer vacuole tube in advance);

fastening the fixing case, and placing it inside the detection unit;

closing the handle cover of the detection unit;

pressing the cover of the detection unit until it is fastened down;

determining the result after 10 minutes;

recording the detection result, and discarding the enclosed detection unit in a safety place as a whole.

Figure 6:
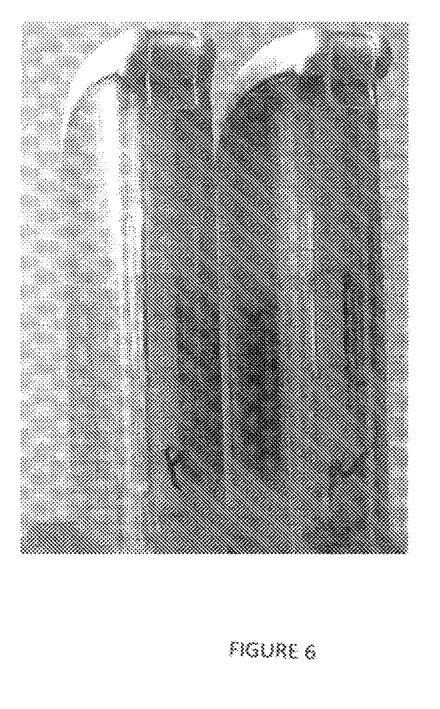
FIG. 6 is a representation that demonstrates the detection of gonococci utilizing the device and isothermal amplification

The detection result of embodiment 1 is as shown in FIG. 6, wherein the detection line (line T) turns red in the case of a positive sample, while remaining colorless in the case of a negative sample, and the quality control line (line C) turns colored in both cases to indicate that the result is valid.

Embodiment 2

Detecting a product of isothermal amplification (A Method for Amplifying A Target Nucleic Acid Sequence by Using Nickase and A Kit for Amplifying A Target Nucleic Acid Sequence, see another patent of the inventor, App. No. 200610003429.1) of target nucleic acids using cloned DNA in gonococci as the template.

1. Reaction Conditions:
Tube 1:

| | |
|---|---|
| Reactive buffer solution 10x(1000 mM NaCl, 500 mM Tris-HCl, 100 mM MgCl$_2$, 10 mM dithiothreitol, PH 7.9 at 25 DEG C.) | 1 μL |
| Two pairs of primers P1, 2/S1, 2 5 μmol/0.5 μmol | 2 μL |
| Ultrapure water | 5 μL |
| Template gonococcal plasmids (1000 copies/muL) | 2 μL |
| Total | 10 μL |

Denatured at 95 DEG C. for 10 minutes, then naturally cooled to room temperature.
Tube 2:

| | |
|---|---|
| Reactive buffer solution 10x(1000 mM NaCl, 500 mM Tris-HCl, 100 mM MgCl$_2$, 10 mM dithiothreitol, PH 7.9 at 25 DEG C.) | 1 μL |
| dNTP 2 mmol/ | 2 μL |
| Labeled probe | 2 μL |
| Bovine serum albumin 100 ng/μL | 2 μL |
| Nickase N.BstNB I 10 units/μL | 0.5 μL |
| Bst DNA polymerase 8 units/μL | 0.25 μL |
| Ultrapure water | 2.25 μL |
| Total | 10 μL |

The reaction mixtures in tube 1 and tube 2 are mixed uniformly, held in a metal bath at 54 DEG C. for 30 minutes, denatured at 95 DEG C. for 5 minutes, naturally cooled to room temperature, and then subjected to detection.

2. Detection
placing the PCR tube containing the amplification product inside the hole for housing the PCR tube in the fixing case (wherein washing buffer vacuoles have already been provided in the hole for housing the washing buffer vacuole tube in advance);
fastening the fixing case, and placing it inside the detection unit;
closing the handle cover of the detection unit;
pressing the cover of the detection unit until it is fastened down;
determining the result after 10 minutes;
recording the detection result, and discarding the enclosed detection unit in a safety place as a whole.

Figure 7:
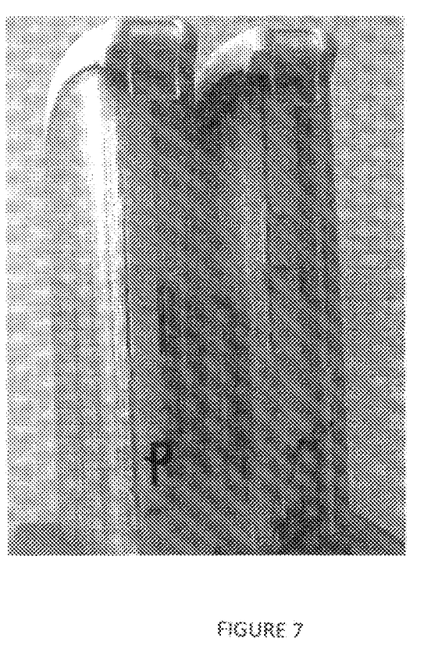
FIG. 7 is a representation that demonstrates the result of the mononucleotide polymorphism detection by using the enclosed nucleic acid amplification product detection device which indicates a G to A mutation at site 11778 in mitochondrial ND4 gene.

The detection result of embodiment 2 are as shown in FIG. 7, wherein the detection line (line T) goes red in the case of a positive sample, while remaining colorless in the case of a negative sample, and the quality control line (line C) turns colored in both cases to indicate that the result is valid.

Embodiment 3

Detection and Typing of Mononucleotide Polymorphism of Mitochondrial DNA G11778A Associated with Leber's Disease Leber's hereditary optic neuropathy (LHON) is a maternally inherited binocular optic nerve disease. It was firstly reported by Wallace in 1988 that a primary point mutation (G to A) at the mitochondrial DNA (mtDNA) nucleotide site 11778 can cause LHON. So far, there has been 25 mtDAN site mutations found to be associated with this disease. Reports in recent years have shown that LHON patients with primary site mutations at 3460, 14484, etc. and LHON patients with coexisted primary and subsequent site mutations all have clinical manifestations similar to those with site mutation at 11778, and consequently, it is difficult for doctors to discriminating the patients according to their clinical manifestations. As a result, molecular biological gene detection has become the most preferred method for determining a Leber's disease caused by different factors. Regarding the diagnostic significance for LHON provided by the typing of mitochondrial site G11778A, an enclosed nucleic acid amplification product detection unit for detecting SNP which is novelly invented by employing the patent is herein used for detecting polymorphism of site G11778A.

1. Sampling
Sampling 5 μl of peripheral venous anticoagulation blood from a subject (frozen), using a kit for quick extraction of DNA in minute quantities produced by Ustar Biotechnologies (Hangzhou) Ltd. to carry out nucleic acid extraction for subsequent gene amplification.

2. PCR
In order to eliminate interference on mitochondrial gene amplification by pseudo genes in gene groups, the amplification needs to be performed twice, wherein the product of the first amplification is used as the template for the secondary amplification, and the product of the second amplification is subsequently used for SBE.

```
Primers:              0.2 μmol

Primers for the first amplification:
Nd4P_out_F         5' TCACTCTCACTGCCCAAAA 3'
Nd4P_out_R         5' GGAGAATGGGGGATAGGTGT 3'

Primers for the second amplification:
Nd4P_in_F          5' CTTCACCGGCGCAGTCATTC 3'
Nd4P_in_R          5' AGGCGAGGTTAGCGAGGCTT 3' dNTP:                 0.2 mmol

Buffer solution:
MgCl2                 3 μmol
KCl                   50 μmol

Tris-HCl (PH 9.0)     10 μmol

Triton-100            1.0%

Tag DNA polymerase    0.8 units

Total                 20 μL
```

PCR reaction procedure:

| PCR with the first pair of primers: | |
|---|---|
| 95 DEG C. | 5 min |
| 35 cycles of: | 94 DEG C. 30 s, 55 DEG C. 45 s, 72 DEG C. 60 s |
| 72 DEG C. | 5 min |
| PCR with the second pair of primers: | |
| 95 DEG C. | 5 min |
| 35 cycles of: | 94 DEG C. 30 s, 65 DEG C. 30 s, 72 DEG C. 30 s |
| 72 DEG C. | 5 min |
| Size of the products: 801 bp (with the first pair of primers) | |
| 182 bp (with the second pair of primers) | |

3. Degrading the Remaining dNTP in the Second PCR Amplification

| Template: the above PCR amplification product | 20 μL |
|---|---|
| Buffer solution: | |
| Bis Tris-Propane | 50 mmol |
| MgCl$_2$ | 1 mmol |

-continued

| | |
|---|---|
| ZnCl$_2$ | 0.1 mmol |
| Thermosensitive phosphatase | 1 unit |
| Total | 30 μL |

Reaction procedure: 37 DEG C., 15 min
Thermosensitive phosphatase inactivation: 80 DEG C., 20 min 4. Single Base Extension (SBE) (Detecting G and A):
Template: the PCR amplification product after the above dNTP degradation 30 μL

```
Extension primer:                           0.1 μmol

5' FITC-TCAAACTACGAACGCACTCACAGTC 3'        0.5 μmol
(Forward)
Biotin-ddGTP/Biotin-ddATP Buffer solution:
Tris-HCL(pH 9.5)                            26 mmol MgCl2                                       6.5 mmol Thermal sequencing enzyme:                  0.5 units Total                                       40 μL SBE reaction procedure:
95 DEG C.                                   60 s
72 DEG C.                                   90 s
```

5. Detection
   placing the PCR tube containing the SBE reaction product inside the hole for housing the PCR tube in the fixing case (wherein washing buffer vacuoles have already been provided in the hole for housing the washing buffer vacuole tube in advance);
   fastening the fixing case, and placing it inside the detection unit;
   closing the handle cover of the detection unit;
   pressing the cover of the detection unit until it is fastened down;
   determining the result after 10 minutes;
   recording the detection result, and discarding the enclosed detection unit in a safety place as a whole.

Figure 8:
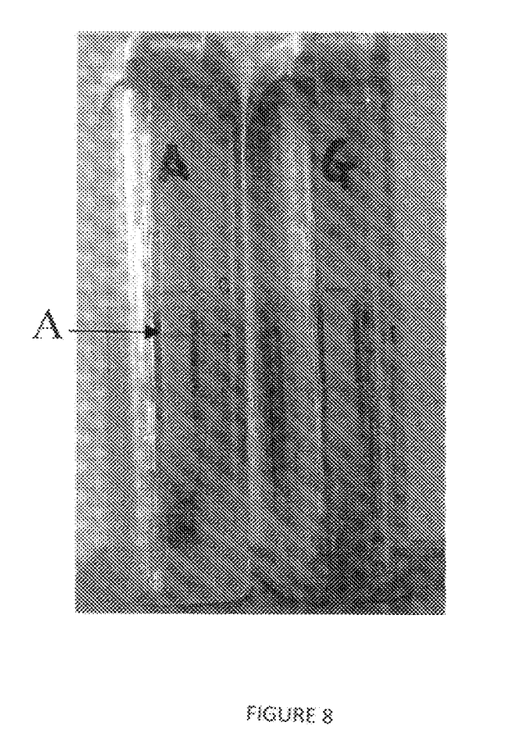

The result of the mononucleotide polymorphism detection by using the enclosed nucleic acid amplification product detection unit is as shown in FIG. 8, which indicates a G to A mutation at site 11778 in mitochondrial ND4 gene. The result is in consistence with the sequencing result.

The invention claimed is:

1. A method for rapid detection of a target nucleic acid amplification product which prevents contamination of the target nucleic acid amplification products comprising the steps of:
   a) performing nucleic acid amplification in a fluid in an unopened reaction tube to produce the target nucleic acid amplification product;
   b) placing the unopened reaction tube inside a fixing case part;
   c) placing the fixing case part inside an open detection unit;
   d) closing the detection unit such that the reaction tube is punctured and a washing buffer vacuole containing washing buffer is punctured such that the fluid containing the target nucleic acid amplification product and the washing buffer is transferred to a sterile visual detection strip within the device such that the fluid is retained within the detection device; and
   e) detecting the target nucleic acid amplification product, wherein the detection unit comprises an inner core (1) and an outer casing (15), wherein the inner core comprises a fixing case part (2); a base part (5), wherein the fixing case part (2) contains two holes respectively for a washing buffer vacuole (3) and a reaction tube (11) containing an amplification product (7) and wherein the base part (5) comprises a washing buffer container (21) having a vacuole puncture needle (4), an amplification product container (22) having a blade (9), a sealing diaphragm (6), a piece of glass fiber paper (8) and a test strip sealing part having a test strip (13) sealed therein and a transparent window (12); and the outer casing comprises a handle cover (16), a fixing case pressing part (17), a washing buffer vacuole extruding part (18), and a transparent window (20).

2. The method of claim 1 wherein the detection unit further comprises a sealing ring (10) positioned between the hole for housing the reaction tube (11) and the base (5) to prevent the flow of the amplification product back into the fixing case (2).

3. The method of claim 1 wherein the sealing diaphragm comprises an alternating vertically disposed three layer structure.

4. A method for rapid detection of a target nucleic acid amplification product which prevents contamination of the target nucleic acid amplification products, comprising the steps of:
   a) placing an unopened reaction tube containing the target nucleic acid amplification product inside detection unit comprising an inner core (1) and an outer casing (15), wherein the inner core comprises a fixing case part (2); a base part (5), wherein the fixing case part (2) contains two holes respectively for a washing buffer vacuole (3) and a reaction tube (11) containing an amplification product (7) and wherein the base part (5) comprises a washing buffer container (21) having a vacuole puncture needle (4), an amplification product container (22) having a blade (9), a sealing diaphragm (6), a piece of glass fiber paper (8) and a test strip sealing part having a test strip (13) sealed therein and a transparent window (12); and the outer casing comprises a handle cover (16), a fixing case pressing part (17), a washing buffer vacuole extruding part (18), and a transparent window (20) and a sealing ring (10) positioned between the hole for housing the reaction tube (11) and the base (5);
   b) placing the fixing case part inside the outer casing;
   c) closing the handle cover of the detection unit;
   d) pressing the handle cover until the detection unit is sealed such that the blade cuts the reaction tube and the washing buffer vacuole is punctured such that the target nucleic amplification product and washing buffer are mixed and adsorbed onto the test strip by capillary action; and
   e) detecting the target nucleic amplification product.

* * * * *